March 8, 1966  R. BOGUSLAWSKI  3,239,044
SYNCHRONIZATION INSTALLATION FOR CHANGE-SPEED TRANSMISSIONS
Filed Feb. 5, 1963  4 Sheets-Sheet 1

INVENTOR
RUDOLF BOGUSLAWSKI
BY: Dicke & Craig
ATTORNEYS

March 8, 1966  R. BOGUSLAWSKI  3,239,044
SYNCHRONIZATION INSTALLATION FOR CHANGE-SPEED TRANSMISSIONS
Filed Feb. 5, 1963  4 Sheets-Sheet 2

INVENTOR

RUDOLF BOGUSLAWSKI

BY Dicke & Craig

ATTORNEYS

INVENTOR
RUDOLF BOGUSLAWSKI
BY: Dicke & Craig
ATTORNEYS

March 8, 1966  R. BOGUSLAWSKI  3,239,044
SYNCHRONIZATION INSTALLATION FOR CHANGE-SPEED TRANSMISSIONS
Filed Feb. 5, 1963  4 Sheets-Sheet 4

INVENTOR
RUDOLF BOGUSLAWSKI
BY: Dicke & Craig
ATTORNEYS

United States Patent Office 3,239,044
Patented Mar. 8, 1966

3,239,044
SYNCHRONIZATION INSTALLATION FOR
CHANGE-SPEED TRANSMISSIONS
Rudolf Boguslawski, Munich, Germany, assignor to
Bayerische Motoren Werke, Munich, Germany
Filed Feb. 5, 1963, Ser. No. 256,344
Claims priority, application Germany, Feb. 9, 1962,
B 65,868
4 Claims. (Cl. 192—53)

The present invention relates to a synchronization installation for gear-wheel change-speed transmission, especially for motor vehicles, provided with a slotted friction ring on the inside of which is arranged a supporting means increasing the servo-effect thereof and extending at least over a substantial portion of the length of the friction ring, the ends of the supporting means being in the operating position thereof in force-locking connection by way of abutments, on the one hand, with the end of the friction ring pointing in the direction of rotation and, on the other, with an oppositely directed abutment surface of a hub portion supporting the synchronization installation.

Known in the prior art is a synchronization installation of this type of construction provided with a stressing band or clamping member the end regions of which overlap axially adjacent one another. Both end regions thereby carry, respectively, abutments rigidly secured on the inside and outside thereof. Depending on the direction of rotation, one of the inner abutments, namely, the forwardly disposed abutment at the blocking band, as viewed in the direction of rotation, is supported against a radial limiting surface of an aperture in the hub portion carrying the synchronization installation. The outer rearwardly disposed abutment at the blocking band, as viewed in the rotation, serves for the support of the end of the friction ring pointing in the direction of rotation. During the initiation of the synchronizing operation, the friction ring is at first freely rotated in the direction of rotation to such an extent that the end thereof pointing in the direction of rotation abuts against the outer abutment of the blocking band which points oppositely to the direction of rotation. Upon a further rotation of the friction ring the blocking band is thereupon spread apart or expanded by entrainment of its outer abutment and comes into abutment against the inner surface of the friction ring over the entire length thereof. The end of the blocking band pointing in the direction of rotation is supported thereby at the hub portion with its inner abutment. The blocking band produces upon its expansion radially outwardly acting forces which result in a very high blocking effect of the friction ring against the sliding movement of a clutch or coupling sleeve. The servo-effect is so large that oftentimes self-jamming or self-blocking occurs so that the shifting of the clutch members which are in synchronism cannot be realized or realized only with very large shifting forces. A further disadvantage of this prior art construction resides in the difficulty of constructing the abutments at the stressing band in one piece, that is, integral therewith or to fasten these abutments securely at the stressing band. By reason of these shortcomings, this type of construction has not lent itself heretofore for use and exploitation in practice.

The present invention eliminates the aforementioned shortcomings by the simultaneous application of the following features, some of which may be individually known, per se:

(a) The ends of the supporting means define within the area of the slot aperture of the friction ring the ends of an arcuate space;

(b) A separate connecting member is arranged within this space which force-lockingly connects the respective end of the friction ring pointing in the direction of rotation with the oppositely directed end of the supporting means, and (c) The other end of the supporting means is supported at an abutment of the hub portion which is arranged substantially within the area of the slot aperture of the friction ring, radially inwardly thereof.

As a result of this construction of the synchronization installation in accordance with the present invention, it is possible, by the use of simple individual parts to achieve also a very high blocking effect, whereby, however, the ends of the friction ring are not directly expanded or spread so that the tendency for self-jamming or self-blocking is avoided in a far-reaching manner. The supporting means and the connecting member as well as the abutments represent separate loose parts which do not require any mutual interconnection but come into contact with each other exclusively by a force-locking connection.

It is known already in the prior art to provide a synchronization installation in which the supporting means and the different abutments are in the form of separate loosely inserted parts. However, in such prior art construction separate supporting members are provided for each direction of rotation which results in the disadvantage that, on the one hand, the blocking effect is less than with the type of construction of the present invention and, on the other, the shifting sleeve is, by the one-sided expansion of the friction ring on its central guide means, pressed toward this side so that additional friction of the shifting sleeve occurs within its guide means and there occurs, by reason of the existing operating clearance thereof, a tumbling movement made possible by the sum of the fitting clearances and therewith an inaccurate engagement into the counter-coupling member. These disadvantages lead to increased shifting forces with strong wear at the shifting forks or make necessary a repeated actuation of a separating clutch.

According to still another feature of the present invention, a separate abutment member is arranged between the ends of the supporting means and the abutments thereof at the hub portion which separate abutment member is constructed substantially in a T-shape and is provided with substantially the same arrangement and dimension as regards the direction of rotation as the connecting member. This abutment member is also arranged directly adjacent to the connecting member whereby the web portion of the T-shape engages radially in an aperture of the hub portion and the leg portions of the T-shape, bent approximately in the direction toward the web portion, are disposed between an axial extension of the hub portion, radially inwardly, and the leg portions of the connecting member or the ends of the friction ring, radially outwardly. A required limitation of the occurring servo-effect is made possible in a simple manner by the fact that the connecting member arranged adjacent to the abutment member is limited with respect to the abutment member in its fredom of movement in the direction of rotation by means of form-locking abutments of the two parts with respect to each other. As a result thereof, the danger of self-jamming or self-blocking is thereby completely eliminated. This measure is also applicable to other types of constructions in that the movability of the connecting member or the abutments corresponding thereto at the supporting means are limited to a predetermined measure.

A further feature of the present invention essentially consists in arranging between the friction ring and the leg portions of the connecting member guide elements rigidly connected with the hub portion. Such measure prevents the tilting of the connecting member as a result of the torque acting thereon by reason of its support, on the one hand, against the supporting means and, on the other, against an end of the friction ring which may also have as consequence a disadvantageous self-jamming or self-blocking effect. Also, this feature may be applied equally to other types of constructions with a slotted friction ring and support means arranged therewithin. These guide means are provided advantageously with an abutment surface which points toward the web portion of the T-shaped connecting member and limits the movability of the connecting member in the direction of rotation. In this manner an excessive servo-effect may also be eliminated as described hereinabove.

The limitation of the servo-effect is achieved in both constructions by the fact that the movability of the connecting member in the direction of rotation is limited to an extent which corresponds to a maximum permissive stressing of the supporting element and therewith of the friction ring. Advantageously a maximum stressing is permitted which effects a position of the supporting member and of the friction ring that corresponds to the expanded rest position of the friction ring with flush abutment of the supporting means at the inner surfaces thereof. Additionally, the movability of the connecting member may be limited in one direction of rotation in such a manner that a stressing of the supporting means is prevented in this direction of rotation. This measure may be possibly utilized also for the facilitated shifting of the starting speed of the change-speed transmission.

It is particularly advantageous to construct the guide elements at the sides thereof, opposite to the web portion of the connecting member in the circumferential direction, as abutment surfaces for the ends of the supporting means. A separate abutment member is thereby obviated. Furthermore, as a considerable advantage compared to the types of constructions known heretofore, an aperture in the hub portion becomes superfluous. This aperture, as a matter of fact, disturbs or is harmful to the fastening connection of the hub portion on the transmission shaft when this connection involves a press fit, since difficulties may result by reason of a loosening of the press fit of the hub portion. Furthermore, the non-uniform shape of the hub portion may easily lead to hardening stresses, warpings and distortions in the manufacture.

Additionally, the construction of the synchroniztion installation in accordance with the present invention is so realized that the supporting means, depending on the direction of rotation, alternately comes into force-locking contact at one end with the abutments connected with the hub portion and at the other end thereof with the end faces of the leg portions of the connecting member. In order to eliminate in one direction of rotation the servo-effect of the supporting means, one end of the supporting means comes into force-locking contact only with the abutment coordinated thereto and connected with the hub portion but not with the connecting member. If the supporting means is constituted of a band material, then it is advantageous if the end faces of the ends of the supporting element are enlarged by an approximately rectangularly bent portion.

Elastically yielding bands were used heretofore as supporting elements in the described synchronization installations. This, however, entails the disadvantage that both during the build-up of the servo-effect additionally produced by the supporting elements as well as also during the decrease thereof after attained synchronism, a rotation of the friction ring and of the connecting member is necessary moving over relatively larger angular deflections in order to deform the elastic band for the purpose of achieving the expanding or spreading force. A certain period of time, however, is required with these operations during which the synchronizing operation does not possess the full value. A large portion of time of the shifting operation is therefore used for the build-up and decrease or subsiding of the synchronizing operation. It may even happen at times that with a rapid shifting the relatively still slight servo-effect is not sufficient in order to block the shifting sleeve in the shifting movement thereof until synchronism of the coupling members so that a shifting without synchronism takes pace which is connected with noise and wear. This means that the safety of the synchronization installation against engagement of the coupling or clutch prior to attained synchronism is not always sufficient. This is particularly the case if the band-shaped supporting elements possess, in the unstressed condition, a considerably stronger curvature than the internal surface of the friction ring whereby a particularly large rotational path of the friction ring and of the intermediate member is necessary for the build-up of the servo-effect. The differing curvature of the inner surface of the friction ring and of the band-shaped supporting element also results in the further disadvantage that the friction ring is expanded or spread apart unevenly over the circumference, that is, is displaced unilaterally out of its center position. The shifting sleeve which is in frictional engagement with the friction ring is then also displaced together with the friction ring laterally on the guide means thereof whereby undesirable friction and clamping forces result which have as consequence increased shifting forces. These high shifting forces require furthermore a high leverage in the shifting linkage. The desired contact for shifting, that is, a shifting feel is thereby substantially lost for the driver so that it is not possible for the driver to ascertain, without anything further, whether the shifting operation has or has not been completely carried out up to the engagement of the clutch or coupling members.

It is already known to utilize, in lieu of elastic bands, a fully closed endless rigid supporting ring or upright edgewise-positioned ring segments as supporting elements. These types of construction, however, produce only locally a support at the inner surface of the friction ring. They lead, therefore, to local wear of the inherently elastically yielding friction ring along the outwardly disposed friction surfaces thereof and therefore, did not find practical acceptance.

According to a still further feature of the present invention, it is proposed for purposes of avoiding these disadvantages that the supporting means consist of a number of substantially rigid bodies which are arranged freely movably in an arcuately-shaped row within the annular space radially inwardly of the friction ring. Advantageously, roller bodies are used with the axes of rotation are arranged parallel to the hub axis of the synchronization installation. However, it is also possible to utilize cubic bodies or bodies of any other suitable shape. Furthermore, the selection of the material is left open in the most far-reaching manner, it being only necessary for the avoidance of the aforementioned disadvantages that these bodies are not excessively elastic because in that case the disadvantage of an elastic band again make their appearance. This, however, does not exclude in principle that elastic bodies may be used.

With such a type of synchronization installation, the bodies forming the supporting means are at all times in abutment against the inner surface of the friction ring by the centrifugal force of the rotating parts. During initiation of the shifting operation, a relatively slight rotation of the friction ring therefore suffices in order to produce, without application of force, immediately the full blocking effect thereof. This is so as by the slight rotation of the friction ring the individual bodies are brought into mutual contact by way of the connecting member and the abutment at the hub portion so that a rigid support of the friction ring end pointing in the direction of rotation takes place by way of the connecting member and the uninterrupted series of bodies forming the supporting element up to the abutment surface of the hub portion. Thus, the friction ring cannot be compressed any more immediately after initiation of the shifting operation so that the shifting sleeve also has no possibility for the further movement. Furthermore, the friction ring itself may be constructed with only relatively slight residual inherent stress. Even after achieving synchronism no elastic yieldingness has to be overcome in the support of the friction ring so that the blocking effect is decreased suddenly and an easy engagement of the clutch or coupling members is made possible for the driver with undisturbed shifting feel. An even friction load of the friction ring over the entire circumference thereof is assured by reason of the closely adjacent supporting points of the bodies forming the supporting means at the inner surface of the friction ring. As a result of the accurate effectiveness of the synchronization installation and especially as a result of the rapid build-up and decrease or dying-down of the inner supporting forces, the synchronization operation and therewith the shifting operation is considerably shortened as a whole. Furthermore, this offers the possibility to bring into synchronism, without difficulties and within the shortest possible time, relatively heavy masses that could hardly be controlled heretofore. All of the aforementioned advantages are attained with a construction of the synchronization installation that contains parts that may be manufactured in a simple manner.

It may be necessary for the actuation of the synchronization installation in stand-still, as, for example, for the engagement of the first transmission speed, to limit the inner supporting forces in order to enable the rotation of the shifting sleeve with respect to the second clutch or coupling member and therewith to enable the engagement thereof. This is achieved in accordance with the present invention with a synchronization installation in which the connecting member is limited with respect to the hub portion in its movability in the direction of rotation by inserting between the connecting member and the supporting means an intermediate member that is elastically yielding in the direction of rotation. In this manner, during engagement of the clutch or coupling teeth, the shifting sleeve may be rotated by a small amount against the elastically yielding intermediate member for purposes of interengagement of the teeth. Consequently, also for the engaging operation of the first transmission speed during standstill of the vehicle, it is not necessary to abandon the application of supporting means and therewith a certain blocking effect of the synchronization installation.

In order to achieve a completely satisfactory transfer of the supporting forces from the supporting means to the friction ring and to the abutments connected with the hub portion, it is proposed in accordance with the present invention to arrange drag elements or entrainment members between the ends of the supporting means, on the one hand, and the abutments connected with the hub portion as well as the end faces of the leg portions of the connecting member, on the other. These drag elements or entrainment members are constructed appropriately of L-shape and one leg portion thereof extends between the abutments fast with the hub portion and the concentric axial extension of the hub portion. The end face of this leg portion thereby comes into contact with one end face of the leg portion of the connecting member whereas the other leg portion of the drag element or entrainment member projects between the abutment surface rigid with the hub portion and the end of the supporting means. In this manner, blocking bands without angular bends at the ends thereof may be used as well as blocking bodies which are provided with only a relatively narrow end face or even with a line contact in the circumferential direction, as, for example, roller bodies.

With a synchronization installation having a multipartite supporting means which extends continuously at least over a substantial portion of the length of the friction ring, it is advantageous for purposes of equalization of the unbalance caused by the connecting member and eventually the abutment member or the guide elements and drag elements to insert between the portions of the supporting means, within the area thereof disposed diametrically opposite to the slot aperture of the friction ring, a rigid drag or entrainment member that is freely movable in the direction of rotation.

Accordingly, it is an object of the present invention to provide a synchronization installation of the type described hereinabove which eliminates, in a reliable manner and by simple means, the aforementioned disadvantages and shortcomings encountered with the prior art constructions.

It is another object of the present invention to provide a synchronization installation of the type described hereinabove which eliminates any tendency of jamming or blocking within the synchronization installation as well as the occurrence of frictional forces that would require relatively larger shifting forces for changing the speeds or the transmission.

A further object of the present invention resides in the provision of a synchronization installation that operates in a reliable manner, requires relatively slight shifting forces yet utilizes only parts that may be manufactured and assembled in a relatively inexpensive and simple manner.

A still further object of the present invention resides in the provision of a synchronization installation in which the various parts thereof are made of separate loose elements which do not require any mutual connection but are in contact with each other exclusively by force-locking connections.

Another object of the present invention resides in the provision of a synchronization installation of the type described hereinabove which eliminates one-sided expansion of the friction ring, non-uniform stressing of the parts, and excessive play between the parts that may lead to relatively heavy wear and difficult shifting of the change-speed transmission.

A still further object of the present invention resides in the provision of a synchronization installation in which a limitation of the occurring servo-effect is achieved by simple means, eliminating completely the danger of self-jamming.

Another object of the present invention is the provision of a synchronizing installation of the type described hereinabove in which the individual parts thereof may be made in such a manner as not to require any structural weakening thereof, thereby permitting use of press fits without danger of developing loose joints in the course of use.

A still further object of the present invention resides in the provision of a synchronization installation in which the servo-effect of the supporting means may be lessened or eliminated in one direction of rotation to thereby facilitate engagement of the starting speed of the change-speed transmission from standstill.

Still a further object of the present invention resides in the provision of a synchronization installation of the type described hereinabove which significantly reduces the time required for the build-up and die-down periods of the synchronization operations thereby also reducing the time required for the shifting operation and therewith enabling quicker shifting than has been realizable heretofore.

Another object of the present invention resides in the provision of a synchronization installation for change-speed transmissions of motor vehicles which assures at all times a shifting feel to the driver.

A still further object of the present invention resides in the provision of a synchronization installation of the type described hereinabove in which even wear of the friction surfaces of the friction ring over the entire circumference thereof is assured and synchronization of larged masses is made possible.

These and other objects, features, and advantages of the present invention will become more obvious from the following description when taken in connection with the accompanying drawing which shows, for purposes of illustration only, several embodiments in accordance with the present invention and wherein.

Figure 1:
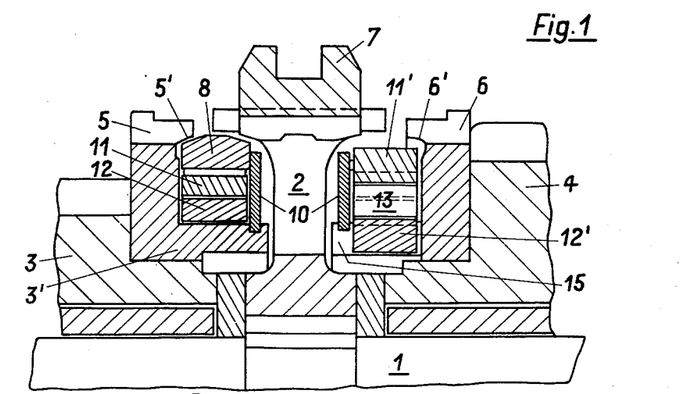
FIGURE 1 is a partial longitudinal cross-sectional view through a change-speed transmission for a motor vehicle provided with a synchronization installation in accordance with the present invention.
Figure 3:
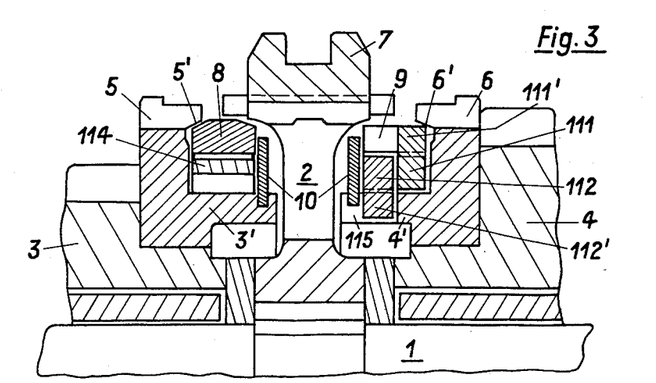
FIGURE 3 is a partial longitudinal cross-sectional view, similar to FIGURE 1, through a motor vehicle change-speed transmission provided with a modified embodiment of a synchronization installation in accordance with the present invention.
Figure 6:
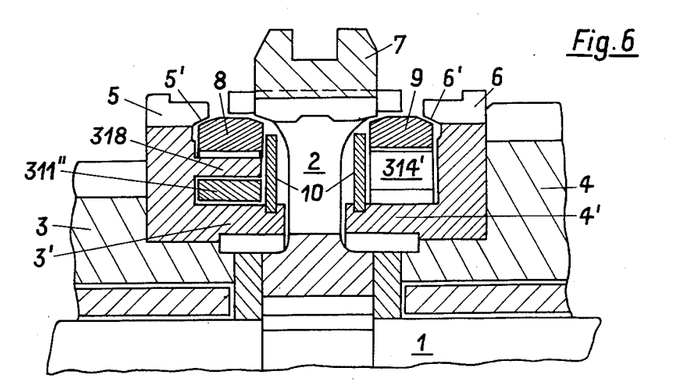
FIGURE 6 is a partial longitudinal cross-sectional view, similar to FIGURE 1, through a change-speed transmission provided with a still further modified embodiment of a synchronization installation in accordance with the present invention.

Referring now to the drawing wherein like reference numerals are used throughout the various views to designate like parts, and more particularly to FIGURES 1, 3 and 6, reference numeral 1 designates therein the shaft of a motor vehicle change-speed transmission, shown only in part in these figures. To both sides of a shifting sleeve carrier 2 one gear wheel each 3 and 4 is freely rotatably supported on the shaft 1. The sleeve carrier 2, in contradistinction thereto, is securely connected with the shaft 1 for rotation in unison therewith. Claw teeth 5 and 6 are arranged at the gear wheels 3 and 4, the claw teeth being intended for purposes of coupling engagement with an internally toothed shifting sleeve 7 arranged for rotation in unison with the sleeve carrier 2 and longitudinally displaceable with respect thereto. In order to permit the coupling engagement of the shifting sleeve 7 only during synchronism thereof with a gear wheel 3 or 4 to be engaged or the claw teeth 5 and 6 thereof, synchronizing installations, to be described more fully hereinafter, are operatively associated with or coordinated to the gear wheels 3 and 4.

The synchronization installations consist essentially of a pre-stressed slotted friction ring 8, 9 as well as of means within the friction ring 8, 9 for reinforcing the expanding effect of the friction ring. Clamping or snap rings 10 as well as machined recesses or cut-outs 5' and 6' at the claw teeth 5 and 6 hold the parts of the synchronization installations at the gear wheels 3 and 4, respectively. The construction so far described is the same in all embodiments of the present application so that these parts are designated in each embodiment with corresponding reference numerals. Different in the various embodiments, however, is the construction of the means for reinforcing the expanding effect of the friction ring which are arranged within the friction ring.

Figure 2:
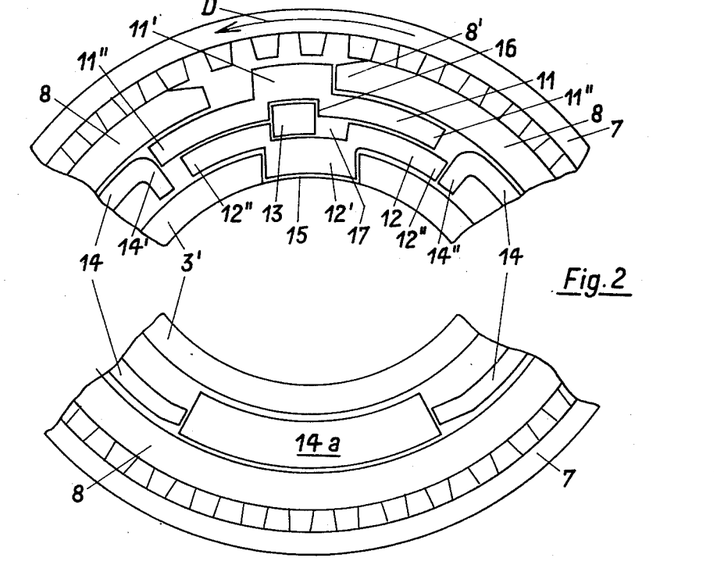
FIGURE 2 is a partial transverse cross-sectional view through the synchronization installation of FIGURE 1 with a three-partite supporting means in the working position thereof.

According to the embodiment of FIGURES 1 and 2, these means consist of a connecting member 11, an abutment member 12, a limiting member 13, and a supporting element 14. The connecting member 11 and the abutment member 12 are constructed of T-shape and are arranged radially within the friction ring 8 within the area of the slot aperture thereof. The relatively short web portion 11' of the T-shaped connecting member 11 engages, on the one hand, radially outwardly into the slot aperture of the friction ring 8 and the relatively short web portion 12' of the T-shaped abutment member 12 engages, on the other, radially inwardly into an aperture 15 provided in an axial extension of the hub portion 3' or 4'. The leg portions 11" and 12" of the T-shape of the connecting member 11 and abutment member 12, respectively, are curved correspondingly to the arc of the friction ring 8 and the extension of the hub portion 3' so that they adapt themselves to the contour of both of these parts inwardly and outwardly thereof, respectively. The lengths of the leg portions 11" and 12" are chosen approximately equal, and more particularly in such a manner that the leg portions 11" of the connecting member 11 abut in every angular position of the friction ring 8 with a predetermined length against the inner surface of the end region of the friction ring 8, whereby the connecting member 11 is retained within the friction ring 8. The abutment member 12 abuts inwardly thereof against the connecting member 11 and is retained thereby in its position and in engagement with the aperture 15.

Between the connecting member 11 and the abutment member 12 is additionally inserted in the embodiment of FIGURES 1 and 2 a limiting member 13. The limiting member 13 is not absolutely necessary for the operation of the synchronization installation in accordance with the present invention. The limiting member 13 engages in an axial groove 16 of the connecting member 11 in a form-locking manner without any possibility of movement in the direction of rotation D. On the other hand, the limiting member 13 possesses a limited freedom of movement in the direction of rotation D within an aperture 17 provided in the abutment member 12 so that, as a result thereof, the connecting member 11 also possesses the limited movability with respect to the abutment member 12. The limiting member 13 may also be supported, with the same result, in a non-movable manner in the direction of rotation D within the abutment member 12 and movably within the connecting member 11 instead. Furthermore, it is also possible within the present invention to divide the movability to both parts or to construct the limiting member as integral projection or extension of one of the two aforementioned parts.

As supporting means there is provided according to the embodiment of FIGURES 1 and 2, a slotted springy band 14 which extends either in a continuous uninterrupted manner over nearly the same length as the friction ring 8 or is constructed in a two-partite manner as shown in FIGURE 2 whereby a drag or entrainment member 14a which is freely movable in the direction of rotation is inserted opposite the slot aperture of the friction ring 8 for the equalization of any mass unbalances. The two ends 14' and 14" of the supporting means 14 are provided with enlarged end faces by means of approximately rectangularly bent end portions which enable a contact of the supporting means 14 both with the leg portions 11" of the connecting member 11 as well as with the leg portions 12" of the abutment member 12.

*Operation*

During initiation of the shifting operation by means of the shifting sleeve 7 with a direction of rotation assumed in the embodiment of FIGURE 2, for instance, in the direction of arrow D, the shifting sleeve 7, as a result of the axial movement thereof, at first comes into contact with the friction ring 8. The friction ring 8 is taken along in the direction of rotation and abuts with the end 8' pointing in the direction of rotation against the web portion 11' of the connecting member 11. The connecting member 11 is now displaced in the direction of rotation. During that time, the leg portion 11" pointing in the direction of rotation presses against the adjacent end 14' of the supporting means 14. The other end 14" of the supporting means 14 abuts against the leg portion 12" of the abutment member 12 pointing in a direction opposite to the direction of rotation. As a result thereof, upon further rotation of the friction ring 8, the supporting means 14 is stressed and pressed outwardly against the inner surface of the friction ring 8. The spreading or expanding of the friction ring 8 which already exhibits a certain self-reinforcing effect, is thereby further reinforced so that a very high blocking effect results therefrom against the continued sliding movement of the shifting sleeve 7 over the friction ring 8 which, for that purpose, has to be compressed. The synchronization work is thereby considerably increased so that short shifting periods together with a rapid attainment of synchronism without danger of shifting faults result therefrom.

The limiting member 13 becomes operative when a maximum permissive expansion or spreading of the supporting means 14 is attained. This maximum permissive spreading or expanding is advantageously so selected that the friction ring 8 is expanded beyond the normal rest position thereof illustrated in FIGURE 1 and conditioned by its own inherent residual stress, only with a limited expanding or spreading force, that is, spring force of the supporting means. As a result thereof, damage of the claw teeth 5 and 6 by expanding is eliminated as well as also a breaking of the shifting sleeve 7 by excessive expanding forces. The magnitude of the maximum permissive expansion can be determined in a simple manner by the matching of the width of the limiting member 13 to the width of the aperture 17 within the abutment member 12. If the maximum permissive expansion is attained, then the limiting member 13, as illustrated in FIGURE 2, abuts the direction of rotation D against the radial surfaces of the aperture 17 and prevents a further movement of the connecting member 11 in the direction of rotation D. A further stressing of the supporting means 14 as well as an increase in the expanding forces which act on the friction ring 8 from within thereof are prevented thereby.

A reinforced shifting-force influence on the shifting sleeve 7 forcibly and necessarily produces a reinforced expansion of the supporting means 14 and therewith a reinforced abutment of the friction ring 8 with an also reinforcing friction at the shifting sleeve and self-reinforcement of the expanding effect or blocking effect thereof. Consequently, the equilibrium between the shifting force and blocking effect of the friction ring is established within the smallest axial movements of the shifting sleeve and a shifting prior to attaining synchronism is avoided with the greatest safety.

If synchronism is achieved between the shifting sleeve 7 and the gear wheel 3 or 4 to be engaged, then the expanding or spreading effect of the friction ring 8 ceases and the shifting sleeve 7 can be brought, with simultaneous compression of the friction ring 8 against its own inherent spring stress, over the latter into engagement with the claw teeth 5 or 6 coordinated to the gear wheel to be engaged. The supporting means 14 is also compressed thereby whereby the connecting member 11 is displaced by the end of the supporting means 14 in contact therewith together with the friction ring in the direction toward the center position.

Figure 4:
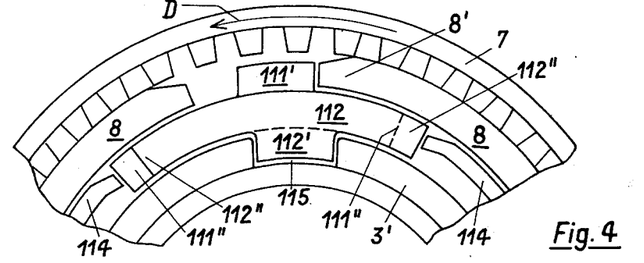
FIGURE 4 is a partial transverse cross-sectional view through the synchronization installation of FIGURE 3 in the working position thereof.

In the embodiment of FIGURES 3 and 4, the connecting member 111 and the abutment member 112, in differentiation from the embodiment of FIGURES 1 and 2, are arranged axially adjacent one another so that they each have only one-half the width of the friction ring 8 and of the supporting means 114. This embodiment requires less space and renders superfluous an enlargement in the ends of the supporting means. Furthermore, the aperture 115 in the axial extension of the hub portion 3' or 4' is also constructed only of one-half the width of the friction ring 8 so that the hub portion 3' or 4' which is secured on the gear wheel 5 or 6 by means of a press fit, is weakened to a lesser extent by the aperture 115. Moreover, this lesser width of the aperture 115 also reduces possible distortions, warpings and strains during the heat-treatment of the hub portion 3' or 4' provided with the claw teeth 5' or 6', respectively. A limiting member corresponding to the part 13 of FIGURES 1 and 2 may also be provided in the same manner in the embodiment of FIGURES 3 and 4.

Figure 5:
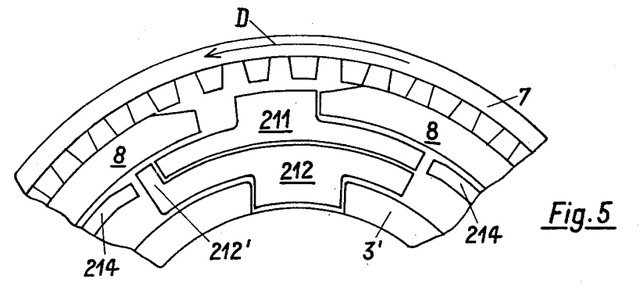
FIGURE 5 is a partial transverse cross-sectional view, similar to FIGURE 4, through a modified embodiment of a synchronization installation in accordance with the present invention which is operable for eliminating the blocking effect in one direction of rotation.

FIGURE 5 illustrates a construction in which the supporting means 214 remains inoperable in the illustrated direction of rotation D in order, for example, to facilitate the engagement of the starting speed during standstill of the vehicle. This is achieved by an extension 212' which prevents the movement of the connecting member 211 in this direction of rotation and therewith precludes a stressing of the supporting means 214. The same effect may also be obtained by means of a radially inwardly directed extension of the connecting member 211 at the oppositely disposed end thereof in combination with an enlargement of the end faces of the ends of the supporting means as well as also by corresponding matching and adaptation of the limitating member 13 according to FIGURES 1 and 2.

Figures 7, 7A:
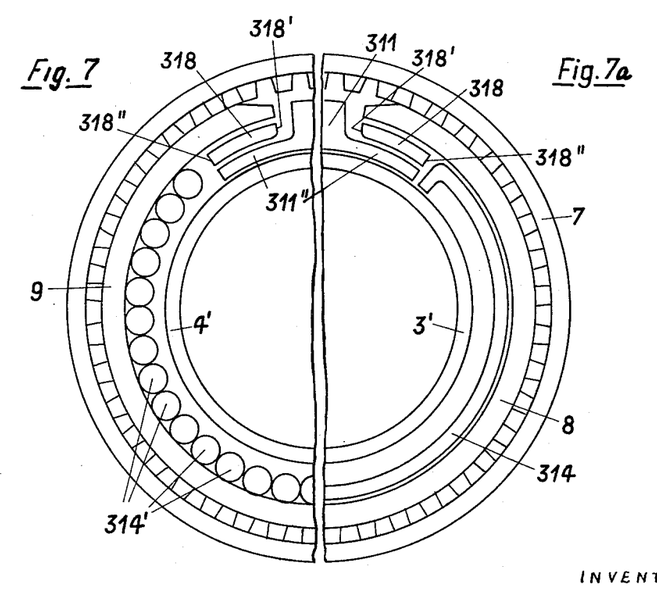
FIGURE 7 is a partial transverse cross-sectional view through the synchronization installation according to FIGURE 6 provided with roller members as supporting means.
FIGURE 7a is a partial transverse cross-sectional view, similar to FIGURE 7, and illustrating the arrangement of the synchronization installation of FIGURE 6 with a supporting means consisting of a band.

The constructions according to FIGURES 6, 7 and 7a do not possess any separate abutment members. For that reason, no aperture is necessary within the axial extension of the hub portion 3' or 4' so that the aforementioned disadvantages which are connected with such an aperture, are completely eliminated. The connecting member 311 slides in this construction directly on the axial extension of the hub portion 3' or 4' and is radially guided at the leg portions 311" thereof by means of guide webs 318 whereby a tilting thereof is precluded. The guide webs 318 form an end abutment for the maximum permissive expanding or spreading effect of the supporting means 314 or 314' at the end faces 318' thereof disposed within the area of the slot aperture of the friction ring 8. At the oppositely disposed end faces 318', the guide webs 318 constitute the direct support of the supporting means 314 or 314' at the hub portion 3' or 4'.

Whereas the supporting means in FIGURE 7a is constructed, in conformity with the embodiment so far described, as springy band 314, FIGURES 6 and 7 illustrate a supporting means which is effectively composed of a plurality of rollers 314'. In the place of the rollers, other roller bodies such as sleeves or balls may also be used. Additionally, small blocks of cubic shape or other appropriate shape may find use with the illustrated arrangement. Advantageous is the construction of these bodies from rigid or solid material so that any yieldingness of the supporting element is eliminated. As a result thereof, both the build-up as well as the decrease of the expanding or spreading forces takes place within the supporting means without any elastic yieldingness which would lead to various operational disadvantages.

Figure 8:
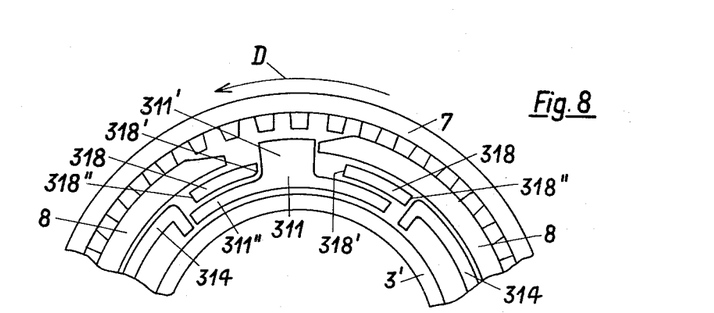
FIGURE 8 is a partial transverse cross-sectional view, similar to FIGURE 7a, with the parts thereof in the working position.

In the embodiment of FIGURE 8, the synchronization installation is illustrated according to FIGURES 6 and 7a in the working position thereof. As significant differentiation from the embodiments illustrated in FIGURES 2 and 4, the supporting means 314 of FIGURE 8 abuts with the enlarged end surfaces against the end faces 318″ of the guide webs 318 rigid with the hub portions. These guide webs 318 simultaneously prevent the tilting of the connecting member 311 by means of the moment acting thereon resulting from the non-coaxial support of the friction ring 8 at its web portion 311′ and of the supporting means 314 at the end of the leg portion 311″ pointing in the direction of rotation. The rearwardly disposed end of the connecting member 311, as seen in the direction of rotation, is thereby prevented from being pressed outwardly against the end of the friction ring 8. This abutment can lead to shifting faults by reason of the fact that an additional radial unilateral displacement is imparted to the friction ring 8 which is transferred to the shifting sleeve and influences the central guidance thereof on the sleeve carrier 2 whereby locking or jamming may result with corresponding increase of the required shifting forces. This radial, one-sided displacement of the shifting sleeve may, however, also give rise to a very disadvantageous tumbling movement of the shifting sleeve which has as consequence strong wear appearances at the shifting forks operatively connected with the shifting sleeve.

One end face 318′ of the guide web 318 disposed in the direction of rotation serves as end aubtment for the connecting member 311 and therewith for the limitation of the expanding forces in the embodiment of FIGURE 8.

Figure 9:
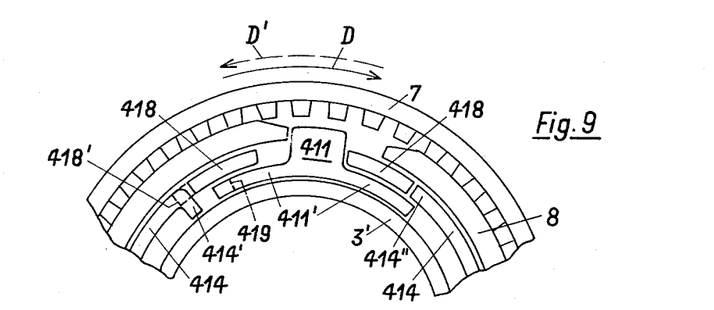
FIGURE 9 is a partial transverse cross-sectional view through a modified embodiment of a synchronization installation according to the present invention, similar to FIGURES 6 to 8, with a blocking effect in only one direction of rotation.

A synchronization installation corresponding far-reachingly to those of FIGURES 6 and 8 is illustrated in FIGURE 9 in the working position thereof in which only one end 414′ of the supporting means 414 constructed as elastic band is enlarged by an approximately rectangularly bent portion in the end surface thereof so that it may come in contact with both the guide web 418 as well as with the leg portion 411′ of the connecting member 411. The other end 414″ of the supporting means 414 extends, in contrast thereto, substantially rectilinearly so that it cannot come into contact with the adjacent leg portion 411′ of the connecting member 411. As a result thereof, a reinforcement of the expanding effect by the supporting means 414 is precluded in the illustrated direction of rotation D which corresponds, for instance, to the engagement of the starting speed in standstill. This effect may, however, also be produced by a shortening 419 of one leg portion 411′ of the connecting member 411. Also in the latter arrangement, the connecting member 411 cannot come into contact with the supporting means 414 in the direction of rotation D′. Finally, the web portion 418 disposed in the direction of rotation D′ which is made in one piece with the hub portion 3′ may be extended in the direction of rotation D′ as indicated by reference numeral 418′. This measure offers the additional advantage that all the other remaining loose parts may be constructed in the same manner as before with all other shifting steps or transmission ratios so that in case of assembly or with possible repairs no mix-ups are possible.

Figure 10:
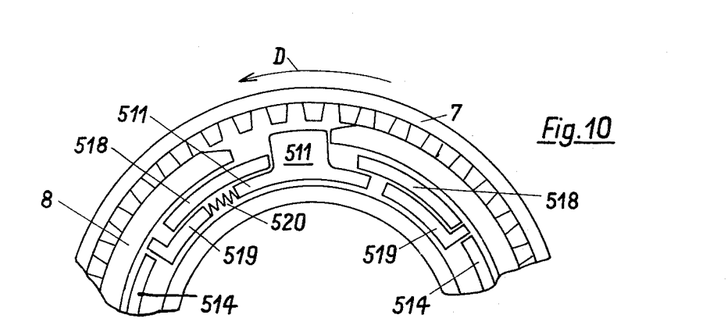
FIGURE 10 is a partial transverse cross-sectional view through a further modified embodiment of a synchronization installation in accordance with the present invention, similar to FIGURES 6 to 8, and operable with a reduced blocking effect in one direction of rotation.

FIGURE 10 shows a synchronization installation in which L-shaped intermediate drag elements or entrainment members 519 and 519′ are inserted between the connecting member 511 and the supporting means 514 or 514′. In case of use of an elastic band 514 as supporting means, this measure enables an essentially straight configuration of the ends thereof, whereby nonetheless, depending on the direction of rotation of the shifting sleeve 7, a contact of the supporting means 514, on the one hand, with the connecting member 511 and, on the other, with the guide webs 518 is possible.

Additionally, in the construction of FIGURE 10, a spring 520 yielding in the direction of rotation D is arranged between the leg portion 511′ of the connecting member 511 and the shortened drag element 519′ co-ordinated thereto. This spring 520 transmits, corresponding to the spring tension thereof, only a limited supporting force of the friction ring 8 from the connecting member 511 to the drag means 519′ and the supporting element 514. This supporting force may be overcome, for purposes of engagement of the starting speed in standstill, by the movement of the shifting sleeve 7 and therewith by a compression of the friction ring 8 and of the supporting means 514 with a movement of the drag element 519′ so that the engagement of the starting speed is also possible when the teeth of the shifting sleeve 7 and of the claw teeth 5 or 6 of a gear wheel 3 or 4 abut against one another with the inclined end faces thereof in such a manner that engagement is possible only by a rotation of the shifting sleeve with respect to the pre-stressed friction ring in the same direction which would effect a further stressing of the supporting means and therewith an increase in the blocking effect of the friction ring. However, since such movement is not possible by the abutment of the connecting member 511 against a guide web 518, the supporting means 514 and the friction ring 8 may be radially compressed by the yieldingness of the spring 520 and the teeth of the shifting sleeve 7 may be engaged with simultaneous rotary movement in the claw teeth 5 or 6 of the gear wheel 3 or 4 to be engaged.

While I have shown and described several embodiments in accordance with the present invention, it is understood that the same is not limited thereto but is susceptible of numerous changes and modifications within the spirit and scope of a person skilled in the art, and I therefore do not wish to be limited to the details shown and described herein, but intend to cover all such changes and modifications as are encompassed by the scope of the appended claims.

I claim:

1. A synchronization installation for gear wheel change-speed transmissions, especially for motor vehicles, said installation being subject to rotation during synchronization, comprising:

a friction ring having peripherally spaced ends defining a slot aperture, supporting means for increasing the servo effect of said friction ring during synchronization, said supporting means having ends and being disposed within said friction ring, said supporting means extending over a substantial portion of, but less than the arcuate extent of said friction ring, the ends of said supporting means defining the ends of an arcuate space therebetween in a zone adjacent said slot aperture and radially inwardly thereof, hub means supporting said synchronization installation, a substantially cylindrical axial extension of said hub means disposed radially inwardly of said supporting means, and abutment means including abutment surface means on said hub means for establishing a force-locking connection of said ends of said supporting means, in a position thereof operative to increase the said servo effect of said friction ring, on the one hand with the end of said friction ring pointing in the direction of said rotation and, on the other, with an abutment surface included in said abutment surface means and facing in the opposite direction, said abutment means including:

a connecting member separate from said supporting means and arranged in said arcuate space, said connecting member being adapted to abut said end of said friction ring pointing in the direction of said rotation and one of said ends of said supporting means, said one of said ends pointing in said opposite direction, said connecting member being of approximately T-shaped construction and having a web portion and leg portions, said web portion extending into said slot aperture of said friction ring, and said leg portions extending away from said web portion in positions intermediate said friction ring and said axial extension of said hub means, said abutment surface means on said hub means being arranged in said zone adjacent said slot aperture, the other end of said supporting means during synchronization abutting said abutment surface means, said abutment surface means and said connecting member being disposed axially adjacent one another and in confrontation with the inner peripheries of said ends of said friction ring.

2. A synchronization installation for gear wheel change-speed transmissions, especially for motor vehicles, said installation being subject to rotation during synchronization, comprising:

a friction ring having peripherally spaced ends defining a slot aperture, supporting means for increasing the servo effect of said friction ring during synchronization, said supporting means having ends and being disposed within said friction ring, said supporting means extending over a substantial portion of, but less than the arcuate extent of said friction ring, the ends of said supporting means defining the ends of an arcuate space therebetween in a zone adjacent said slot aperture and radially inwardly thereof, hub means supporting said synchronization installation, a substantially cylindrical axial extension of said hub means disposed radially inwardly of said supporting means, and abutment means including abutment surface means on said hub means for establishing a force-locking connection of said ends of said supporting means, in a position thereof operative to increase the said servo effect of said friction ring, on the one hand with the end of said friction ring pointing in the direction of said rotation and, on the other, with an abutment surface included in said abutment surface means and facing in the opposite direction, said abutment means including:

a connecting member separate from said supporting means and arranged in said arcuate space, said connecting member being adapted to abut said end of said friction ring pointing in the direction of said rotation and one of said ends of said supporting means, said one of said ends pointing in said opposite direction, said connecting member being of approximately T-shaped construction and having a web portion and leg portions, said web portion extending into said slot aperture of said friction ring, and said leg portions extending away from said web portion in positions intermediate said friction ring and said axial extension of said hub means, said abutment surface means on said hub means including an aperture therein located in said zone adjacent said slot aperture, said abutment surface means including a T-shaped member adapted to support the other end of said supporting means, said T-shaped member being axially adjacent said connecting member, the combined widths of said T-shaped member and said connecting member being equal to the width of said supporting means.

3. A synchronization installation for gear wheel change-speed transmissions, especially for motor vehicles, said installation being subject to rotation during synchronization, comprising:

a friction ring having peripherally spaced ends defining a slot aperture, supporting means for increasing the servo effect of said friction ring during synchronization, said supporting means having ends and being disposed within said friction ring, said supporting means extending over a substantial portion of, but less than the arcuate extent of said friction ring, the ends of said supporting means defining the ends of an arcuate space therebetween in a zone adjacent said slot aperture and radially inwardly thereof, hub means supporting said synchronization installation, a substantially cylindrical axial extension of said hub means disposed radially inwardly of said supporting means, and abutment means including abutment surface means on said hub means for establishing a force-locking connection of said ends of said supporting means in a position thereof operative to increase the said servo effect of said friction ring, on the one hand with the end of said friction ring pointing in the direction of said rotation and, on the other, with an abutment surface included in said abutment surface means and facing in the opposite direction, said abutment means including:

a connecting member separate from said supporting means and arranged in said arcuate space, said connecting member being adapted to abut said end of said friction ring pointing in the direction of said rotation and one of said ends of said supporting means, said one of said ends pointing in said opposite direction, said connecting member being of approximately T-shaped construction and having a web portion and leg portions, said web portion extending into said slot aperture of said friction ring, and said leg portions extending away from said web portion in positions intermediate said friction ring and said axial extension of said hub means, said abutment surface means provided on said hub means including an aperture therein arranged in the zone adjacent said slot aperture and radially inwardly thereof, said abutment surface means including abutment means adapted to support the other end of said supporting means, said abutment means including an abutment member separate from said connecting member operatively disposed between said ends of said supporting means and said abutment surface, said abutment member being of approximately T-shaped construction and having a web portion and leg portions, and being located axially adjacent said connecting member, the web portion of said abutment member engaging radially inwardly thereof in said aperture of said hub means, said leg portions being disposed adjacent said axial extension of said hub means radially outwardly thereof, said leg portions being slightly curved in directions toward the last-mentioned web portion, the combined widths of said abutment member and said connecting member being equal to the width of said friction ring.

4. A synchronization installation as claimed in claim 1, wherein the combined widths of said abutment surface means and said connecting member are substantially equal to the width of said friction ring.

References Cited by the Examiner

UNITED STATES PATENTS

| | | |
|---|---|---|
| 2,932,373 | 4/1960 | Schmid. |
| 3,110,382 | 11/1963 | Jones. |
| 3,158,240 | 11/1964 | Harrington. |

FOREIGN PATENTS

| | | |
|---|---|---|
| 769,838 | 3/1957 | Great Britain. |
| 780,155 | 7/1957 | Great Britain. |

DAVID J. WILLIAMOWSKY, *Primary Examiner.*

BROUGHTON G. DURHAM, *Examiner.*